United States Patent [19]
Ott et al.

[11] Patent Number: 4,831,971
[45] Date of Patent: May 23, 1989

[54] METHOD FOR MIXING FUEL WITH WATER, APPARATUS FOR CARRYING OUT THE METHOD AND FUEL-WATER MIXTURE

[75] Inventors: Walter H. Ott, Stäfa; Roland Steinmeier, Schwerzenbach; Werner Zürcher, Zurich, all of Switzerland

[73] Assignee: Harrier Inc., Salt Lake City, Utah

[21] Appl. No.: 120,861

[22] Filed: Nov. 16, 1987

[30] Foreign Application Priority Data

Oct. 23, 1987 [EP] European Pat. Off. ........ 87115582.6

[51] Int. Cl.⁴ .............................................. F02D 19/00
[52] U.S. Cl. ................................ 123/25 A; 123/25 R; 123/25 L
[58] Field of Search ................. 123/25 E, 25 L, 25 R, 123/25 A

[56] References Cited

U.S. PATENT DOCUMENTS

| | | | |
|---|---|---|---|
| 3,606,868 | 9/1971 | Voogd | 123/25 R |
| 4,087,862 | 5/1978 | Tsien | 366/165 |
| 4,132,247 | 1/1979 | Lindbery | 123/25 E |
| 4,183,338 | 1/1980 | Lindberg | 123/25 E |
| 4,388,893 | 6/1983 | Apfel | 123/25 E |
| 4,412,512 | 11/1983 | Cottell | 123/25 E |
| 4,463,708 | 8/1984 | Gerry | 123/25 E |
| 4,696,279 | 9/1987 | Lindberg | 123/25 E |
| 4,732,114 | 3/1988 | Binder et al. | 123/25 E |

FOREIGN PATENT DOCUMENTS 3504699 8/1986 Fed. Rep. of Germany .
8301210 4/1983 PCT Int'l Appl. .

Primary Examiner—E. Rollins Cross
Attorney, Agent, or Firm—Michael N. Meller

[57] ABSTRACT

A mehtod for mixing water and diesel fuel in a ratio between 5 and 20 Vol %, in which the liquid components are recirculated in a recirculation loop comprising an ellipsoidal vortex chamber (10) in which rotation around a longitudinal axis (9) is attained, the rotating fluid is expanded and tangentially injected in a baloon-like second vortex chamber (16) with an axis (17) normal to that of the first chamber, the open lower end of the second rotational chamber (16) is connected to fluid inlets and suction side of a recirculating pump. The outlet occurs from the equatorial plane of the second vortex chamber. The outflow rate should be at least ten times less than the flow in the recirculation loop. The mixture which have water droplets smaller than 200 nm has a consistency similar to that of fuel and can be used as fuel to diesel engines, whereby the amount of unwanted components in the exhaust gases will be reduced.

23 Claims, 5 Drawing Sheets

METHOD FOR MIXING FUEL WITH WATER, APPARATUS FOR CARRYING OUT THE METHOD AND FUEL-WATER MIXTURE

The invention relates to a method for mixing diesel fuel with water to obtain a combustible emulsion, in which the amount of water to fuel falls in a range of 5 to 20 Vol %, wherein the fuel and the water are injected in a closed space in a ratio faling in this range and are intensively moved to obtain a physical mixture. The invention relates also to a diesel fuel water mixture comprising water in 5 to 20 Vol % compared to fuel, in which water drops are finely distributed in the fuel without the use of any emulgator. Finally, the invention relates to an apparatus for carrying out the method.

It has been known for a long time that the addition of a small amount of water to diesel fuel can decrease the unwanted components of the exhaust gases in a diesel motor. A number of ways have been suggested to the production of emulsions of fuel and water that can be used in diesel motors instead of pure diesel fuel. A first part of such solution related to the use of a specific emulgeator by which a stable emulsion could be obtained. The use of such emulsions have not obtained wide acceptance so far, mainly due to their high costs and several limitations.

The second part of such solutions related to the physical mixture of the two components without any emulgeator. The main problem lies in that water and fuel cannot be mixed easily, and the water takes the form of small droplets in the emulsion. Depending on the size of such droplets the beneficial effects of the water-fuel mixture can not prevail. A further problem lies in that such physically made emulsions are not stable and water tends to separate from fuel after some time of storage. A further problem of such mixtures is the expensive and energy-consuming way of their generation which often off-sets any advantage obtainable by the more perfect burning. It can be stated that physical mixtures of diesel fuel and water has not gained wide acceptance either.

The main object of the invention is to provide a comparatively stable and readily utilizable fuel water mixture that can be used in diesel engines to improve efficiency and to reduce unwanted components of exhaust gases.

A further object of the invention to provide a method for producing such a mixture.

A still further object of the invention is to provide an apparatus for carrying out the method.

According to the invention a method has been provided for mixing diesel fuel with water to obtain a combustible emulsion, in which the amount of water to fuel falls in a range of 5 to 20 Vol %, wherein the water and fuel are intensively recirculated in a closed loop, in each loop a first vortex is formed, in the first vortex the circulating fluid is forced to rotate around and moved along an axis of a first vortex chamber so that the pressure is increased along the axial movement, the pressure of the rotating fluid is suddenly decreased by a predetermined amount when leaving the first vortex chamber then it is gradually increased in a tapering passage duct while the rotation is maintained, the fluid rotating around the axis of movement is passed tangentially in a second vortex chamber to form a second vortex around a second axis substantially normal to the axis of rotation of the inflowing fluid, the fluid is rotated around and passed along the second axis and the fluid leaving the second vortex chamber is pumped and recirculated again in the first vortex chamber, a portion of the recirculated fluid is lead out of the loop in such a stream that in average the fluid particles participate at least in ten full cycles before they would leave the loop.

In an embodiment of the method in the first vortex chamber the rotating fluid is passed along a first axial direction then being reflected so that the axial direction of movement is reversed.

The pressure of the recirculating fluid should be increased at least by 0.8 and at most by 3 bars by means of a pump in a path defined between the outlet of the second vortex chamber and the inlet of the first vortex chamber and the feeding of water and fluid takes place in this path.

In a preferable use the lead out mixture is passed to a fluid pump of a diesel engine having a return line which is fed back in the circulating loop at the suction side of said pump.

The pressure prevailing in this suction side should be kept below 6 bars.

It is preferable if the pressure of the recirculating fluid is equalized in an equalization chamber before the fluid is passed in the first vortex chamber.

The mixing process will not be influenced by the lead out of the mixture if the fluid is lead out of the second vortex chamber in a peripheral location where the outer diameter of the vortex is about in maximum.

According to the invention a diesel fuel-water mixture has been provided that comprises water in 5 to 20 Vol % compared to fuel, in which water drops are finely distributed in the fuel without the use of any emulgator, in which the size of the droplets is smaller than about 200 nonometers and the physical consistency of the mixture is substantially identical with that of the fuel. It is preferable if the amount of water is between 8 and 12 Vol %.

The apparatus for carrying out the method is characterized in that a recirculating loop is formed that comprises a pump, a vortex housing, a pressure equalizing chamber around the vortex housing connected to the pressure side of the pump, a first vortex connected to the pressure side of the pump, a first vortex chamber with an elongated ellipsoidal shape having a tapering neck portion and a longitudinal axis, a number of tangential inlet holes defined in the vortex housing along a periphery close to the neck portion, the axes of the inlet holes are inclined towards the end of the ellipsoid opposite to the neck portion, a tapering duct with a mouth substantially larger than and communicating with the opening of the neck portion, a second vortex chamber with an axis of rotation substantially normal to the axis of the first vortex chamber, the second vortex chamber has a spherical upper part, a hyperboloidal medium part tapering in downward direction and a neck, the duct is leading tangentially in the second vortex chamber substantially at the equatorial plane of the spherical part, and a passage connecting the neck of the second vortex chamber with the suction side of the pump, an inflow passage for the water and fuel is communicating with the passage and and outflow opening is defined at the wall of the second vortex chamber substantially at the equatorial plane of the spherical part.

It is preferable if the pressure equalizing chamber has an annular shape encircling the vortex housing and each of the inlet holes comprises a countersink with an axis substantially normal to the mantle surface of the vortex housing and a jet portion with an axis inclining rearwardly and tangentially relative to the first vortex chamber.

In a preferable embodiment the outflow opening is coupled to a fuel pump of a diesel engine provided by a return line which is fed back to the passage.

The invention will now be described in connection with preferable embodiments thereof, in which reference will be made to the accommpanying drawings. In the drawing.

Figure 1:
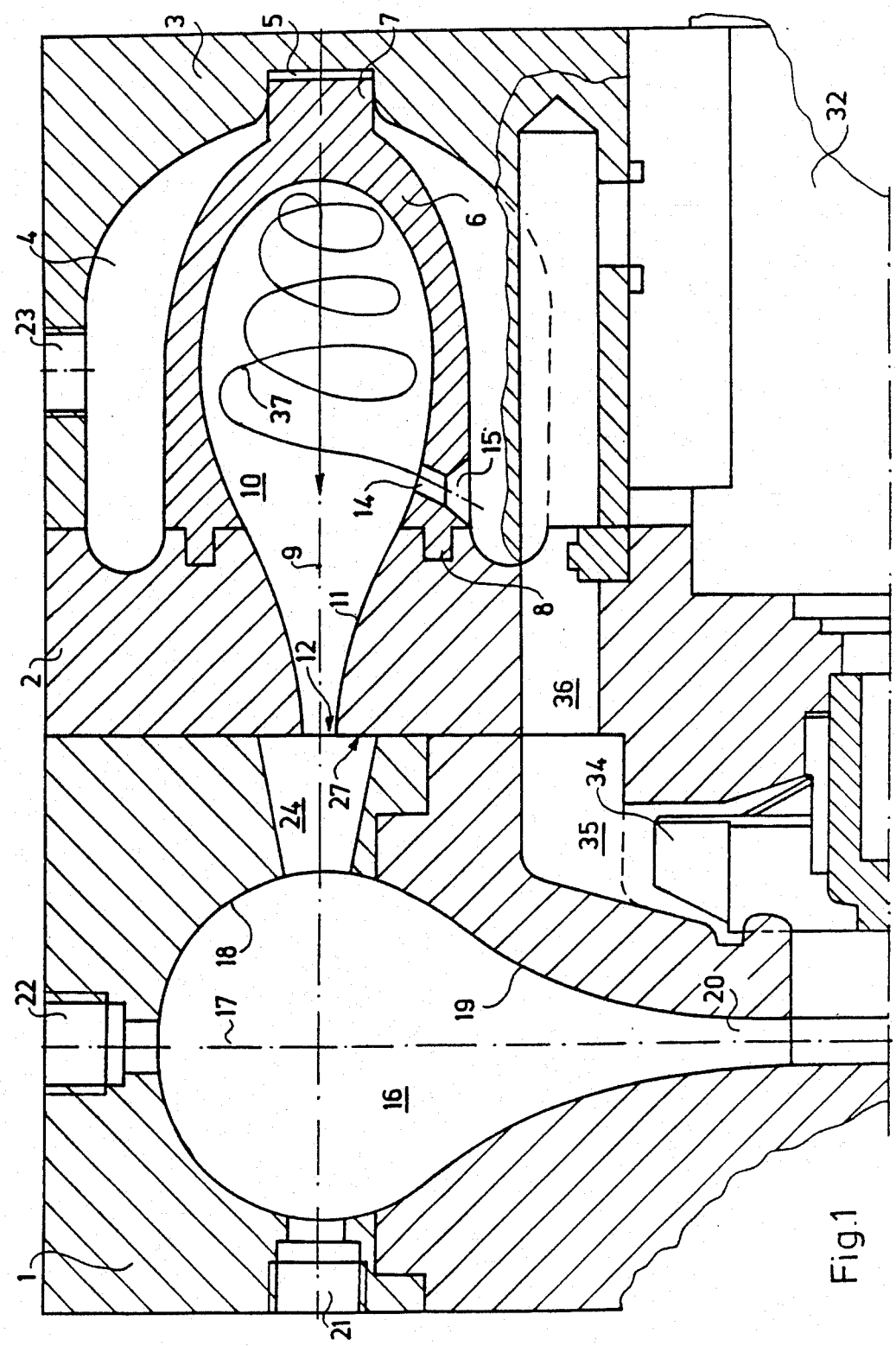
FIG. 1 shows the upper part of the apparatus according to the invention.
Figure 4:
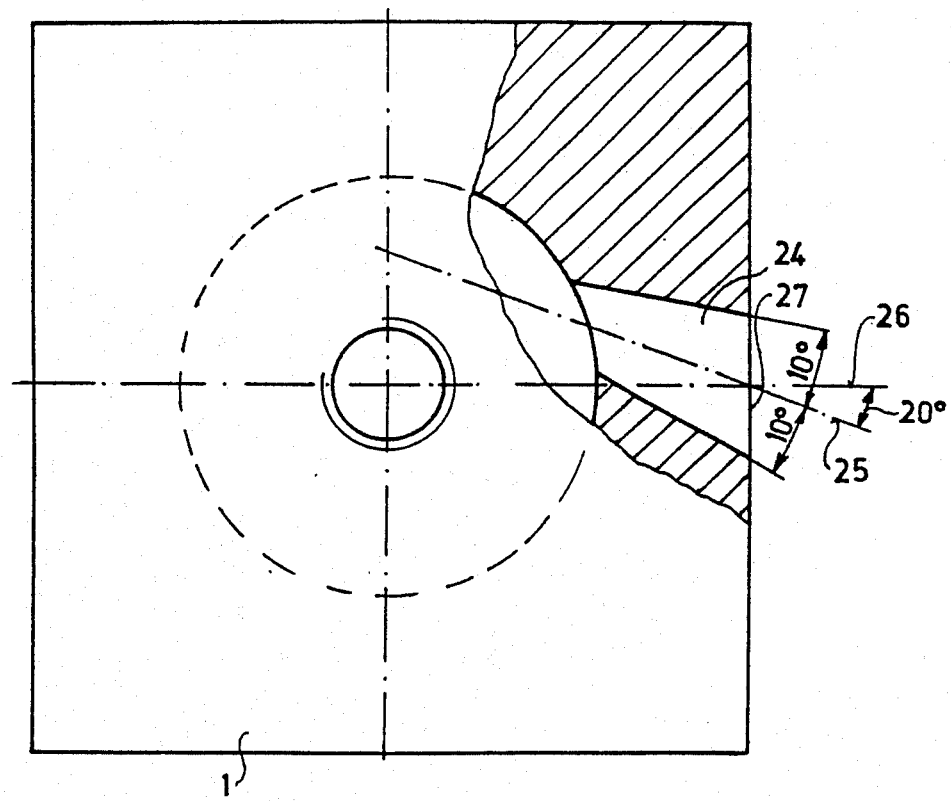
Figure 3:
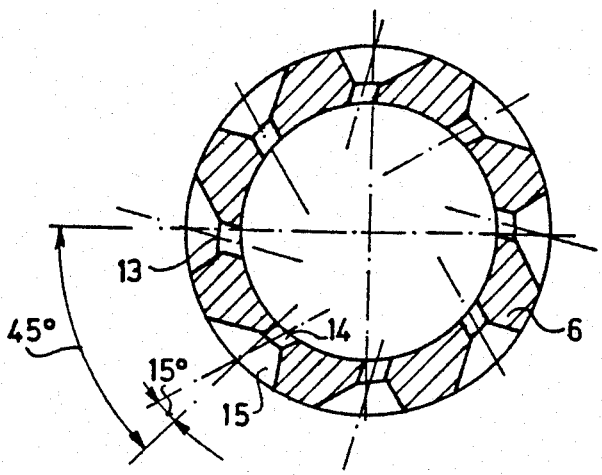
Figure 5:
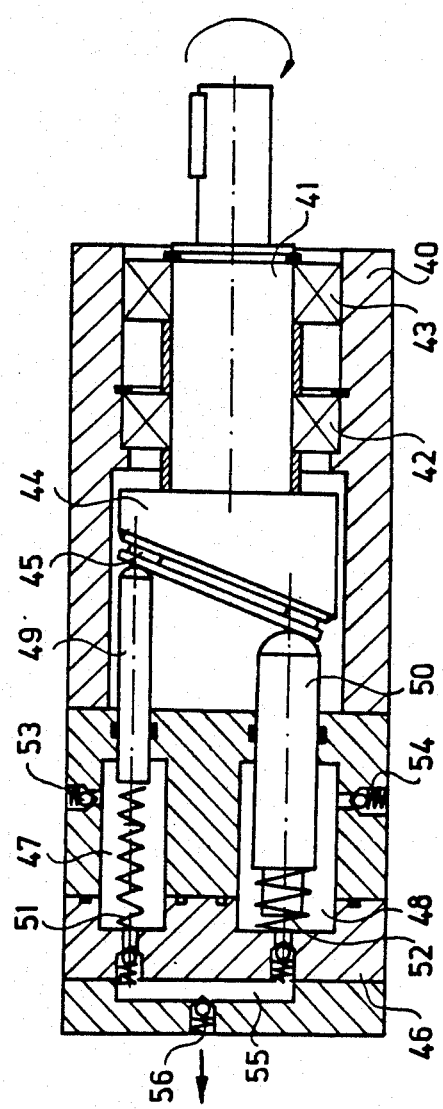
Figure 6:
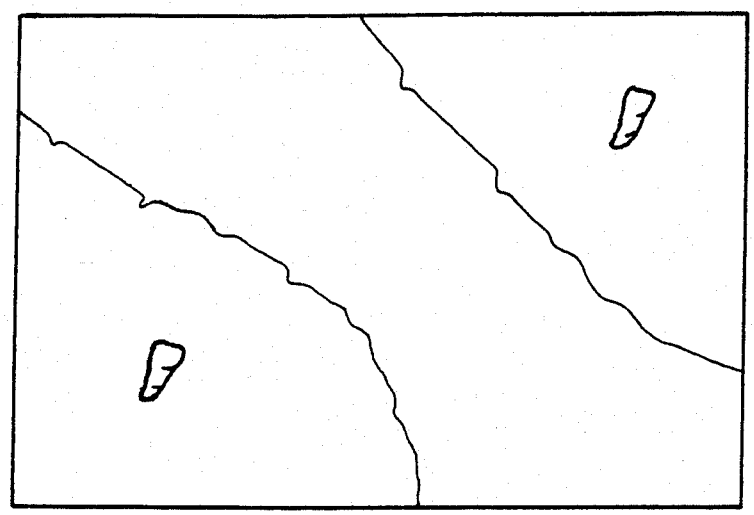
Figure 7:
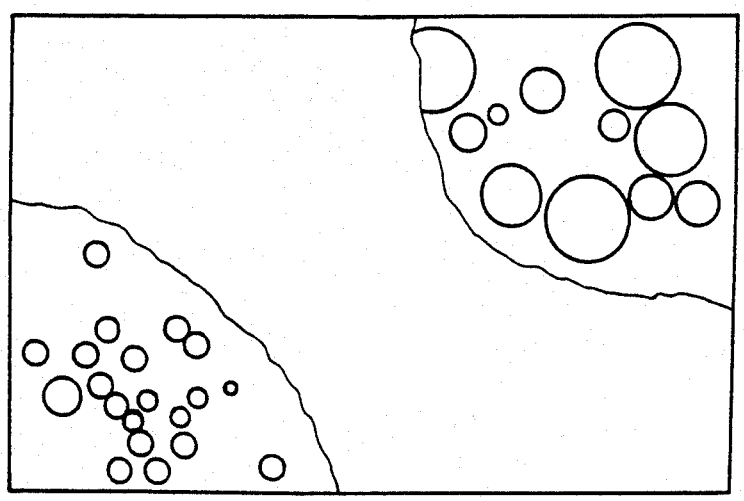

FIG. 3 is a section along the vortex housing 6 of FIG. 1 along a plane normal to the longitudinal axis 9, FIG. 4 is a section taken along the first block 1 of FIG. 1 in the equatorial plane, FIG. 5 is a sectional elevation view of a feeding pump, FIG. 6 is a graphic representation of a microscopic picture taken from diesel fuel and from the mixture according to the invention, and FIG. 7 is a representation similar to FIG. 6 taken from two convential diesel fuel-water mixtures.

The upper part of the mixing apparatus according to the invention comprises a first or main metal block 1, a second block 2 and a box-like third block 3. The third block 3 is attached by means of threaded bolts through the second block to the right side of the first block 1 and the three blocks form a rigid mechanical unit. The third block 3 has a large central cylindrical cavity 4 which has a spherical end with a circular nest-hole in the middle. A vortex housing 6 is fixed in the cavity 4 by means of stud 7 fitted in the nest hole 5 and of a flange 8 fitting in a cylindrical recess of the second block 2.

The vortex housing 6 is an elongted symmetrical element with a horizontal axis 9 of rotation. The outer contour line of the vortex housing 6 is curved in axial direction to substantially correspond to the shape of the cavity 4, whereby an annular pressure chamber is formed around the vortex housing 6. An ellipsoidal vortex chamber 10 is defined in the vortex housing 6 with a tapering neck portion 11 made in the second block 2. The profile of the neck portion 11 has an inflexion plane and a mouth opening 12 at the left face of the block 2. Between the neck portion and the middle of the ellipsoid eight evenly distributed inlet holes 13 are provided in the wall of the vortex housing 6 (FIG. 3). Every inlet hole 13 comprises a jet portion 14 with an axis slightly inclined in axial direction towards the dead end of the ellipsoid and a countersink 15 communicating with the associated jet portion 14. The angle of axial inclination is about 15°-20°. FIG. 3 shows that the axes of the jet portions 14 are inclined also in the plane normal to the axis 9 and the angle of inclination relative to the corresponding radius is about 15°. The countersinks 15 have axes substantially normal to the mantle surface of the vortex housing 6.

The first block 1 defines a second vortex chamber 16 which has a balloon-like shape with a vertical axis 17 of rotation. The second vortex chamber 16 has a substantially spherical upper part 18, a downwardly tapering medium part 19 which has a shpae of a rotational hyperboloid and a short cylindrical neck 20.

Outflow opening 21 is defined at the equatorial plane of the spherical upper 18 with an axis in line with the axis 9 of the first vortex chamber 10. The outflow opening 21 leads to the left side wall 22 of the first block, and end of an outflow pipe (not shown in the drawing) can be fitted therein. Air discharge hole 22 is made in the upper wall of the first block that enables deaeration of the second vortex chamber. In the upper wall of the third block a further air discharge hole 23 is provided for the deaeration of the cavity 4.

An oblique conical duct 24 is provided in the first block 1 extending between the mouth opening 12 of the first vortex chamber 10 and the second vortex chamber 16. First 4 shows that the duct 24 has an axis 25 closing an angle of about 20° with the horizontal axis 26 of the second vortex chamber 16 defined in the equatorial plane. The cone angle of the inwardly tapering duct 24 is also about 20°. The outer mouth 27 of the duct has a diameter substantially larger than that of the mouth opening 12 of the first vortex chamber 10 which latter opening 12 is arranged concentrically in the centre zone of the mouth 27. The duct 24 provides a quasi-tangential passage between the two vortex chambers 10 and 16.

Figure 2:
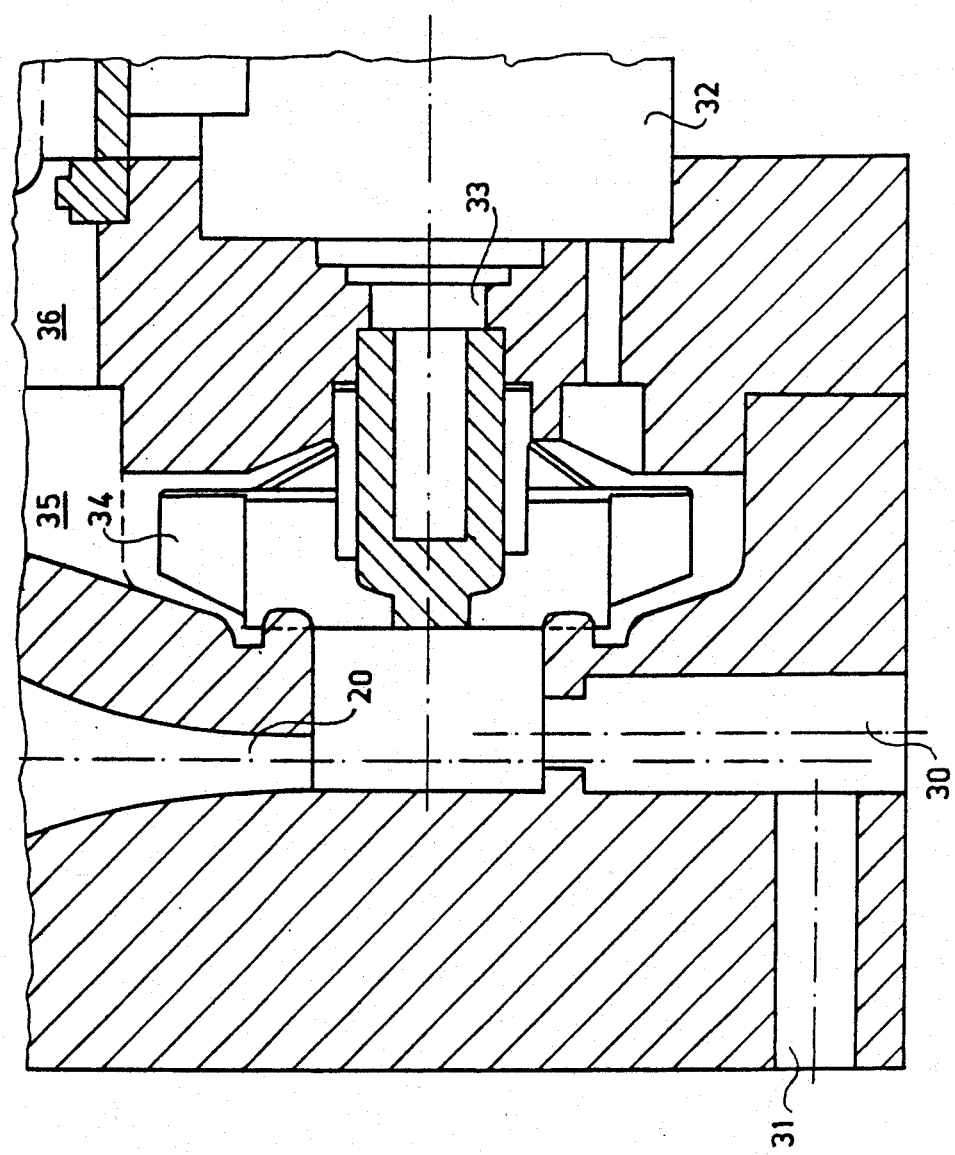
FIG. 2 shows the lower part of the apparatus of FIG. 1.

FIG. 2 shows the lower part of the apparatus of FIG. 1. In the extension of the open neck 20 of the second vortex chamber 16 is a vertical cylinder bore 30 is formed in the first block 1. The bore 30 is open at the bottom to which a return line can be connected with unused (excess) fuel-water mixture. An inflow bore 31 is arranged in the first block 1 that communicates with the bore 30. The inflow bore has a pipe connection to which a feeder pipe of pre-mixed diesel fuel and water can be connected. Such a mixture can be supplied by a feeder pump e.g. like the one shown in FIG. 5.

A pump motor 32 is mounted to the third block 3 that has a horizontal shaft 33 inserted in and sealed from a bore of the second block 2. A pump wheel 34 is mounted on the inner end of the shaft 32. A cylindrical cavity 35 is provided between the first and second blocks 1 and 2, in which the wheel 34 is arranged. In front of the central portion of the wheel 34 the cavity 35 communicates with a widening of the vertical bore 30. Radially above the cavity 35 a horizontal channel 36 is provided in the second and third blocks 2, 3 that leads to the annular cavity 4 around the vortex housing 6.

The operation of the apparatus shown in FIGS. 1 to 4 is as follows.

Pre-mixed diesel fuel and water is supplied to the system via the inflow bore 31. Before normal operation begins, the air in the cavities should be removed. This can be done through the two air discharge holes 22, 23. Let us suppose that no return line is connected to the lower end of the vertical bore 30 and it is closed temporarily. The pump motor 32 is started and the pump starts to circulate the mixture in a closed loop. The suction side of the pump wheel 34 is at the vertical bore 30, while the pressure side is at the channel 36. In a preferable embodiment the pump provides a flow of 1500 l/h and the pressure difference between the two sides of the wheel 34 is about 1 to 3 bar, preferably between 1 and 1.8 bar.

The liquid will fill the annular cavity 4 around the vortex housing 6 and an intensive flow takes place through the tangential jet portions 14 of the inlet holes 13. The comparatively large cavity 4 serves as a pressure equalizer. Owing to the specific rear and tangential orientation of the jet portions 14 and of the form of the first vortex chamber 10, a vortex is created therein which can be characterized by spiral arrow 37 indicated in the first vortex chamber 10. The peripheral zone of the rotating liquid streams towards the dead end of the ellipsoidal space, and from here it will be relfected in forward direction towards the tapering neck portion 11 in the central zone around the axis 9. In this central zone an intensive rotation takes place around the axis 9, the pressure increases and it reaches a maximum at the zone of the mouth opening 12.

It is well known in the art that diesel fuel has a certain degree of compressibility, i.e. the volume thereof slightly varies with the pressure. Compared to the fuel water has practically no compressibility at all. The pressure of the rotating mixture will drop suddenly after the liquid leaves the mouth opening 12 and enters the duct 24 that tapers in forward direction, since the cross-section of the duct is substantially larger than that of the opening 12. The volume of the fuel increases to an extent, while the volume of the water remains unchanged. This flexible volume increase during the rotation might contribute to certain extent to the resulting very fine mixture of fuel and water. The pressure will increase towards the end of the tapering duct again and the liquid is injected tangentially in the second vortex chamber 16 at the equatorial plane thereof. A double vortex will be formed in this chamber, since the injected liquid rotates around its axis of flow, and owing to the specific form of the second vortex chamber 16 and to the tangential inlet, a rotation around the vertical axis 17 takes also place. The sucking effect of the pump results in a vertical streaming of the rotating liquid.

The tapering form of the vortex chamber maintains the rotation and increases its speed in the proximity of the vertical axis 17. The speed distribution will be similar to the funnel of a tornado.

The mixture will be sucked in by the pump again and in the next cycle this process is repeated. The recirculated mixture of the fuel and water will be more and more evenly distributed, i.e. the size of the water droplets effectively decrease and by the end of about the tenth cycle such a fine mixture is obtained, in which the consistency of the mixture cannot be distinguished from that of the fuel.

Such a fine mixture can be obtained continuously if the mixture is lead out of the system in a flow rate which is at most the tenth of the recirculating volume. If the pump provides a flow of 1500 l/h, then the output rate of the mixture can be at most 150 l/h. It is preferable, if the output rate is still less, e.g. 60 l/h which means that in average each liquid particle participates in 25 cycle before leaving the system. The value of 25 is obtained by the division of the two flow rates, i.e. 1500:60=25.

The place from where the liquid can be lead out is rather critical. The liquid outflow should not disturb the turbulence distribution in the two vortex chamgers and in the connecting passage. An optimum place is the equatorial plane of the second vortex chamber 16 where the outflow opening 21 has been provided.

A preferable use of the apparatus is the insertion thereof in the fuel feeding line of a diesel engine. In this use the outflow opening 21 should be connected to the fuel inlet of fuel pump. Since the outflow rate of the emulsion generated by the apparatus according to the invention is relatively stable and the fuel consumption of the diesel engine is fluctuating, the surplus quantity is returned by the fuel pump. The return line is connected to the lower end of the vertical bore 30, which now must be open. The return of the excess amount of emulsion in the circulating flow further improves the consistency of the emulsion.

Such an operation requires that the feed of the fuel and water be pressure-sensitive, so that outflow rate be always equal with the sum of the return and fed rates. In the exemplary embodiment with the pump rate of 1500 l/h and with a return feed the pressure distribution in the system was as follows: in the inlet side of the pump wheel: 0.8 bar, in the pressure equalizing cavity 4:1.8 bar, in the periphery of the second vortex chamber: 2 bar.

The fine mixing results are largely independent from the absolute pressure values in the system. The absolute value of the pressure prevailing in the bore 30 (at the suction size of the pump) can be as high as 5 bars. It has been experienced that the quality of the emulsion has decreased when the pressure was increased above 6 bars. The pressure difference provided by the pump is more critical. A pressure increase of 1 to 1.5 bar can be optimum with dimensions shown in the drawings. This difference can be as high as 3 bars. The size and constructional design of the apparatus allows a large tolerance range regarding both the absolute and relative pressure values.

The proportion of water to fuel in the mixture can be varied within a wide range. In normal diesel engines, however, the increase of water quantity above 20% start to remarkably reduce the effective power of the motor. It is true that the amount of unwanted components in the exhaust gas will be reduced more effectively. The optimum percentage of water to fuel is between about 8% to 12% and the range between 5% to 8% and 12% to 20% is still preferable. Values below or above these limits can be acceptable, however, they cannot provide the benefits connected with the preferable ranges. Under 5% water content the improvement of the composition of the exhuast gases is not as significant to make the use of the apparatus profitable. The problem of efficiency over 20% water in the mixture has already been discussed.

A preferable embodiment of a mixing pump which can provide a mixture of water and fuel with predetermined ratio is shown in FIG. 5. The pump has a cylindrical sleeve 50 in which a shaft 41 is guided by ball bearings 42, 43 for rotation. The shaft 41 has a wider head 44 with inclined face which supports a thrust bearing 45. A piston block 46 is attached to the end of the sleeve 40 which comprises a pressure chamber 47 for water and a pressure chamber 48 for fuel. The size of the two chambers is different. Respective pistons 49 are guided in the piston block 46 for axial movements. One end of each piston is pressed to the thrust bearing 45 by means of respective coil springs 51, 52 in the associated chambers. A water inlet 53 leads through the side wall of the block to the water chamber 47 and a fuel inlet 54 to the fuel chamber. Respective outlets are provided through the end walls of the chambers 47, 48 in which respective ball check valves are arranged to prevent reverse flow. The inlets 53, 54 comprises similar check valves. The outlet sides of the two outlets are coupled to a common channel 55 from which outlet 56 of the mixing pump is branched off.

When a motor rotates the shaft 41, the inclined plane of the head 44 forces the pistons 49, 50 to reciprocal movement. This movement result in the periodical discharge of the liquid in the chamber through the outlet towards the channel. The amount of liquid transported in one stroke is determined by the diameter and length of displacement of the associated piston. The check valves prevent any return flow. The ratio of fuel to water in the output channel 55 is determined by the ratio of diameters of the pistons. In a preferable embodiment a water content of 12% is provided by the mixing pump. The emulsion obtained in this way is far not perfect, the quality mixing takes place in the apparatus shown in FIGS. 1 to 4.

In the following part of the specification the results of microscopic tests carried out on the physical form of the emulsion will be described.

A Zeiss high power light microscope was used with differential interference contrast according to Normanski. The samples were analyzed by a planochromatic oil immersion objective with 100-fold magnification which had a numerical aperture of 1.32. A 6.3-fold large field ocular was used and a 1.25-fold magnification selector was employed. From these data a magnification of 787.5-fold is obtained at the ocular and a full magnification was 1250-fold high. The resolution of this microscope was as high as to able to differentiate structural elements with as small distance as 132 nanometer.

For internal size gauge well defined latex particles were used (produced by Coulter Electronics Ltd. Great Britain) with nominal diameters of 8.7 and 2.7 micrometers. The pictures were taken by a NIKON FE2 type camera without using an intermediate ocular on a reverse slide of Ektachrome with 100 ASA speed.

Samples from diesel fuel and water mixture produced freshly by the apparatus according to the invention (with 10:1 ratio of fuel to water) were taken by a pipette of 4 microliter, these were put on a glass plate covered by another glass plate and sealed by nail polish. The analysis took place without delay.

Three different control fluids were analyzed:
(a) pure diesel fuel identical to that used for the mixture, taken directly from the petrol station column i.e. without any water;
(b) a diesel fuel—water mixture of 10:1 ratio emulgated by an ultrasonic emulgeator; and
(c) the same as in (b) but with a ratio of 50:50 of fuel water.

FIG. 6 right upper and left lower sides are the graphical representation of the pictures obtained from the mixture according to the invention and the pure fuel as (a) hereinabove. The elongated spot visible on both pictures was deliberately a size gauge.

The original diesel fuel and the mixture according to the invention were completely identical on these pictures. There were no visible drops present within the limits of the above defined spatial resolution.

FIG. 7 shows the emulsions with fuel water ratio of 10:1 and 50:50. The pictures show clearly the water drops in front of the homogene fuel background.

From this comparison one can understand that the 10% water is completely embedded in the mixture made according to the invention and even with the the most sensitive microscope the picture shows not difference relative to the pure fuel.

The preliminary tests made on actual diesel engines by the analyses of the composition of the exhaust gases has deomonstrated that the amount of nitrogene oxyde referred simply to as NOX has been reduced even in the worst case at least by 15% and often by a decimal order of magnitude. The amount of carbon black has reduced at least by 50%. With a water content of 10% no reduction of power or increase in fuel consumption was found which means that the effective fuel consumption has been reduced by 10%.

We claim:

1. A method for mixing diesel fuel with water to obtain a combustible emulsion, in which the amount of water to fuel falls in a range of 5 to 20 Vol %, in which the fuel and the water are injected in a closed space in a ratio falling in said range and are intensively moved, characterized in that said injected components are intensively recirculated in a closed loop, in each loop a first vortex is formed, in the first vortex the circulating fluid is forced to rotate around and moved along an axis (9) of a first vortex chamber (10) so that the pressure is increased along the axial movement, the pressure of the rotating fluid is suddenly decreased by a predetermined amount when leaving the first vortex chamber (10) then is gradually increased in a tapering passage duct (24) while the rotation is maintained, the fluid rotating around the axis of movement is passed tangentially in a second vortex chamber (16) to form a second vortex around a second axis (17) substantially normal to the axis of rotation of the inflowing fluid, the fluid is rotated around and passed along the second axis (17) and the fluid leaving the second vortex chamber (16) is pumped and recirculated again in the first vortex chamber (10), a portion of the recirculated fluid is lead out of the loop in such a stream that in average the fluid particles participate at least in ten full cycles before they would leave the loop.

2. A method as claimed in claim 1, wherein in the first vortex chamber (10) the rotating fluid is passed along a first axial direction and is reflected so that the axial direction of movement is reversed.

3. A method as claimed in claim 1, wherein the pressure of the recirculating fluid is increased at least by 0.8 bar and at most by 3 bars by means of a pump in a path defined between the outlet of the second vortex chamber (16) and the inlet of the first vortex chamber (10) and the feeding of water and fluid takes place in this path.

4. A method as claimed in claim 3, wherein the lead out mixture is passed to a fluid pump of a diesel engine having a return line which is fed back in the circulating loop at the suction side of said pump.

5. A method as claimed in claim 4, wherein the pressure prevailing in said suction side is kept below 6 bars.

6. A method as claimed in claim 4 wherein the pressure of the recirculating fluid is equalized in an equalization chamber before the fluid is passed in the first vortex chamber (10).

7. A method as claimed in claim 1, wherein the fluid is lead out of the second vortex chamber (16) in a peripheral location where the outer diameter of said vortex is about in maximum.

8. The method as claimed in claim 2, wherein the pressure of the recirculating fluid is increased at least by 0.8 bar and at most by 3 bars by means of a pump in a path defined between the outlet of the second vortex chamber (16) and the inlet of the first vortex chamber (10) and the feeding of water and fluid takes place in this path.

9. A method as claimed in claim 8, wherein the lead out mixture is passed to a fluid pump of a diesel engine having a return line which is fed back in the circulating loop at the suction side of said pump.

10. A method as claimed in claim 9, wherein the pressure prevailing in said suction side is kept below 6 bars.

11. The method as claimed in claim 5, wherein the pressure of the recirculating fluid is equalized in an equalization chamber before the fluid is passed in the first vortex chamber (10).

12. The method as claim in claimed 6, wherein the fluid is lead out of the second vortex chamber (16) in a peripheral location where the outer diameter of said vortex is about in maximum.

13. An apparatus for mixing diesel fuel with water comprising the formation of a recirculating loop which comprises a pump, a vortex housing (6), a pressure equalizing chamber (4) around the vortex housing connected to the pressure side of the pump, a first vortex chamber (10) with an elongated ellipsoidal shape having a tapering neck portion and a longitudinal axis (9), a number of tangential inlet holes (13) defined in the vortex housing (6) along a periphery close to the neck portion, the axes of the inlet holes (13) are inclined towards the end of the ellipsoid opposite to the neck portion, a tapering duct (24) with a mouth (27) substantially larger than and communicating with the opening (12) of the neck portion (11), a second vortex chamber (16) with an axis of rotation (17) substantially normal to the axis (9) of the first vortex chamber (10), the second vortex chamber (16) has a spherical upper part (18), a hyperboloidal medium part (19) tapering in downward direction and a neck (20), the duct (24) is leading tangentially in the second vortex chamber (16) substantially at the equatorial plane of the spherical part (18), and a passage (30) connecting the neck (20) of the second vortex chamber (16) with the suction side of the pump, an inflow passage for the water and fuel is communicating with the passage (30) and and out-flow opening (21) is defined at the wall of the second vortex chamber (16) substantially at the equatorial plane of the spherical part (18).

14. The apparatus as claimed in claim 13, wherein said pressure equalizing chamber (4) has an annular shape encircling the vortex housing (6) and each of the inlet holes (13) comprises a countersink (15) with an axis substantially normal to the mantle surface of the vortex housing (6) and a jet portion (14) with an axis inclining rearwardly and tangentially relative to the first vortex chamber (10).

15. The apparatus as claimed in claim 13, wherein the outflow opening (21) is coupled to a fuel pump of a diesel engine provided by a return line which is fed back to the passage (30).

16. The apparatus as claimed in claim 31, wherein the inflow passage (30) is connected with the outlet of a fuel-water mixing pump comprising a cylindrical sleeve (40), a shaft (41) in the sleeve guided for rotation, a head (44) of the shaft has an inclined plane supporting a thrust bearing (45), a piston block (46) with respective pressure chambers (47, 48) for the water and fuel are coupled to the sleeve (40), pistons (49, 50) guided for axial displacement are abutting the thrust bearing (45) and extending in the pressure chambers (47, 48), springs (51, 52) in the pressure chambers (47, 48) biasing the ends of the pistons (49, 50) towards the thrust bearing (45), the size of the pistons are corresponding to the predetermined ratio of water to fuel, and the pressure chambers (47, 48) communicating with a common channel (55) coupled to said outlet (56).

17. An apparatus for mixing diesel fuel with water comprising the formation of a recirculating loop which comprises a pump, a vortex housing (6), a pressure equalizing chamber (4) around the vortex housing connected to the pressure side of the pump, a first vortex chamber (10) with an elongated ellipsoidal shape having a tapering neck portion and a longitudinal axis (9), a number of tangential inlet holes (13) defined in the vortex housing (6) along a periphery close to the neck portion, the axes of the inlet holes (13) are inclined towards the end of the ellipsoid opposite to the neck portion, a tapering duct (24) with a mouth (27) substantially larger than and communicating with the opening (12) of the neck portion (11), a second vortex chamber (16) with an axis of rotation (17) substantially normal to the axis (9) of the first vortex chamber (10), the second vortex chamber (16) has a spherical upper part (18), a hyperboloidal medium part (19) tapering in downward direction and a neck (20), the duct (24) is leading tangentially in the second vortex chamber (16) substantially at the equatorial plane of the spherical part (18), and a passage (30) connecting the neck (20) of the second vortex chamber (16) with the suction side of the pump, an inflow passage for the water and fuel is communicating with the passage (30) and and outflow opening (21) is defined at the opening of the second vortex chamber (16) substantially at the equatorial plane of the spherical part (18).

18. The apparatus as claimed in claim 17, wherein said pressure equalizing chamber (4) has an annular shape encircling the vortex housing (6) and each of the inlet holes (13) comprises a countersink (15) with an axis substantially normal to the mantle surface of the vortex housing (6) and a jet portion (14) with an axis inclining rearwardly and tangentially relative to the first vortex chamber (10).

19. The apparatus as claimed in claim 14, wherein the outflow opening (21) is coupled to a fuel pump of a diesel engine provided by a return line which is fed back to the passage (30).

20. The apparatus as claimed in claim 14, wherein the inflow passage (30) is connected with the outlet of a fuel-water mixing pump comprising a cylindrical sleeve (40), a shaft (41) in the sleeve guided for rotation, a head (44) of the shaft has an inclined plane supporting a thrust bearing (45), a piston block (46) with respective pressure chambers (47, 48) for the water and fuel are coupled to the sleeve (40), pistons (49, 50) guided for axial displacement are abutting the thrust bearing (45) and extending in the pressure chambers (47, 48), springs (51, 52) in the pressure chambers (47, 48) biasing the ends of the pistons (49, 50) towards the thrust bearing (45), the size of the pistons are corresponding to the predetermined ratio of water to fuel, and the pressure chambers (48, 48) communicating with a common channel (55) coupled to said outlet (56).

21. The apparatus as claimed in claim 18, wherein the outflow opening (21) is coupled to a fuel pump of a diesel engine provided by a return line which is fed back to the passage (30).

22. The apparatus as claimed in claim 18, wherein the inflow passage (30) is connected with the outlet of a fuel-water mixing pump comprising a cylindrical sleeve (40), a shaft (41) in the sleeve guided for rotation, a head (44) of the shaft has an inclined plane supporting a thrust bearing (45), a piston block (46) with respective pressure chambers (47, 48) for the water and fuel are coupled to the sleeve (40), pistons (49, 50) guided for axial displacement are abutting the thrust bearing (45) and extending in the pressure chambers (47, 48), springs (51, 52) in the pressure chambers (47, 48) biasing the ends of the pistons (49, 50) towards the thrust bearing (45), the size of the pistons are corresponding to the predetermined ratio of water to fuel, and the pressure chambers (47, 48) communicating with a common channel (55) coupled to said outlet (56).

23. The apparatus as claimed in claim 21, wherein the inflow passage (30) is connected with the outlet of a fuel-water mixing pump comprising a cylindrical sleeve (40), a shaft (41) in the sleeve guided for rotation, a head (44) of the shaft has an inclined plane supporting a thrust bearing (45), a piston block (46) with respective pressure chambers (47, 48) for the water and fuel are coupled to the sleeve (40), pistons (49, 50) guided for axial displacement are abutting the thrust bearing (45) and extending in the pressure chambers (47, 48), springs (51, 52) in the pressure chambers (47, 48) biasing the ends of the pistons (49, 50) towards the thrust bearing (45), the size of the pistons are corresponding to the predetermined ratio of water to fuel, and the pressure chambers (47, 48) communicating with a common channel (55) coupled to said outlet (56).

* * * * *